US005715035A

United States Patent [19]

Doi et al.

[11] Patent Number: 5,715,035

[45] Date of Patent: Feb. 3, 1998

[54] INTEGRATED PHOTOFINISHING APPARATUS

[75] Inventors: Toshio Doi; Hiroshi Miyawaki, both of Wakayama, Japan

[73] Assignee: Noritsu Koki Co., Ltd., Wakayama, Japan

[21] Appl. No.: 667,027

[22] Filed: Jun. 20, 1996

[30] Foreign Application Priority Data

Jun. 20, 1995 [JP] Japan .................................... 7-152897

[51] Int. Cl.$^6$ ..................................................... G03B 27/52

[52] U.S. Cl. ..................................... 355/40; 271/6; 53/493

[58] Field of Search .................................. 355/27–29, 40, 355/41; 53/457, 493, 559; 209/559; 271/6

[56] References Cited

U.S. PATENT DOCUMENTS

| | | | |
|---|---|---|---|
| 3,733,770 | 5/1973 | Erickson et al. | 53/457 |
| 3,751,874 | 8/1973 | Schultes et al. | 53/493 |
| 3,804,242 | 4/1974 | Tall et al. | 209/559 |
| 4,114,349 | 9/1978 | Jensen et al. | 53/493 |
| 4,864,355 | 9/1989 | Knecht et al. | 355/27 |
| 4,932,189 | 6/1990 | Signoretto | 53/559 |
| 5,159,385 | 10/1992 | Imamura | 355/28 |
| 5,448,335 | 9/1995 | Ishikawa et al. | 355/40 |

FOREIGN PATENT DOCUMENTS 2-267552 11/1990 Japan .

*Primary Examiner*—D. Rutledge

*Attorney, Agent, or Firm*—Smith Patent Office

[57] ABSTRACT

A photographic printing apparatus includes a sorting apparatus comprising a plurality of receptacles for receiving negative films and prints which circulate in a closed loop path between a film loading station in close proximity to an exposure apparatus and a print loading station where prints, cut from a continuous web of photographic paper, are delivered. The receptacles are driven such that each receptacle related to a receptacle loaded with a specific negative film at the film loading station is positioned in the print loading station in time before a cluster of prints made from the specific negative film is delivered from the photographic printing apparatus.

12 Claims, 12 Drawing Sheets

INTEGRATED PHOTOFINISHING APPARATUS

BACKGROUND OF THE INVENTION

1. Field of the Invention

The present invention relates to an integrated photofinishing apparatus for making photographic pictures, and, more particularly, to an integrated photofinishing apparatus continuously exposing a continuous web of photographic paper to negative films, processing or developing the exposed photographic paper, cutting the photographic paper into prints, and grouping the prints into clusters according to individual negative films.

2. Description of the Related Art

Typically, an integrated photofinishing apparatus of this kind is provided with a sorting feature for grouping prints into sets or clusters of prints according to individual negative films. Negative films include a full length having, for instance 12, 24 or 36 image frames, of film and several pieces of negative strips cut from a full length of a film. After exposure, the negative films in film holders or naked negative films are temporarily held in a pile or in side-by-side arrangement in order of exposure.

A cluster of prints is put on a print receptacle at a print loading station in a circular path and is picked up from the print receptacle by an operator at least before the print receptacle arrives at the print loading station. The cluster of prints is united with a negative film from which the prints are made and returned to a customer. In order to unite a specific negative film and prints made from the specific negative film, the operator must visually check the negatives with the prints in order of exposure. This process of visually checking the negatives with the prints is extremely troublesome work and it tends to allow errors in checking by the operator.

SUMMARY OF THE INVENTION

It is an object of the present invention to provide an integrated photofinishing apparatus that is easy to use and will accurately unite a specific negative film and a cluster of prints made from the specific negative film.

It is another object of the present invention to provide an integrated photofinishing apparatus in which a specific negative film and a cluster of prints made from the specific negative film are united with a high efficiency by a simply structured sorting apparatus.

The aforesaid objects of the invention are achieved by providing an integrated photofinishing apparatus having an exposure apparatus for exposing a continuous web of photographic paper to negative films and a photofinishing apparatus for processing and finishing the exposed part of the photographic paper, cutting the photographic paper into individual prints and loading a cluster of prints made from the negative films at a print loading station, and a sorting apparatus for sorting the prints by the negative films. The sorting apparatus includes a plurality of film receptacles, each receiving a negative film or negative film strips in a film holder, and a plurality of print receptacles, each receiving a cluster of prints made from each negative film. These film receptacles and print receptacles are alternatively guided on a receptacle guide forming a closed loop path extending between the film loading station and the print loading station and are driven such that each print receptacle adjacent to a film receptacle with a specific negative film loaded thereto at the film loading station is positioned in the print loading station timely before a cluster of prints made from the specific negative film are loaded from the photofinishing apparatus. The film receptacle and print receptacle are formed as one integral unit.

The film loading station may be located either in the proximity of the exposure apparatus or below the print loading station. If the film loading station is located below the print loading station, a film conveyer is installed between the film loading station and the print loading station.

In order to hold a film holder in the film receptacle with certainty, a film retaining means is attached to the film receptacle.

According to the integrated photofinishing apparatus, while clusters of prints are delivered from the photofinishing apparatus one after another, a film receptacle related to the print receptacle which is expected to be loaded with a specific cluster of prints has been loaded with a negative film from which the specific cluster of prints has been made before or in advance of arrival of the print receptacle at the print loading station. In other words, a specific negative film and a cluster of prints made from the specific negative film are always unconditionally related to each other when a print receptacle is loaded with the cluster of prints. Consequently, operation of uniting a specific negative film and a cluster of prints made from the specific negative film is easy and accurate.

If the film receptacle and print receptacle are made as an integral receptacle, each integral receptacle loaded with a specific negative film is always loaded with a cluster of prints made from the specific negative film. The retaining means holds the negative film in the film holder, preventing the negative film from slipping out of the receptacle during moving even in a steep receptacle guide path.

The integrated photofinishing apparatus of the invention circulates the receptacles between the film loading station located in close proximity to the exposure apparatus, or adjacent to the film delivery conveyer extending from the exposure apparatus, and the print loading station. This enables the operator to operate the exposure apparatus and collect appropriate units of negative films and clusters of prints made from the negative films without moving around the printing apparatus.

BRIEF DESCRIPTION OF THE DRAWINGS

The above and other objects and features of the present invention will be clearly understood from the following description with respect to the preferred embodiments thereof when considered in conjunction with the accompanying drawings, wherein same or similar parts are designated by the same reference numerals throughout the drawings and in which.

DETAILED DESCRIPTION OF THE PREFERRED EMBODIMENTS

Parts which are not of direct importance to the invention and parts which are purely of conventional construction will not be described in detail. For example, details of exposure, processing and cutting units and their associated elements which are necessary for the integrated photofinishing apparatus have not been set out in detail since their construction and operation can easily be arrived at by those skilled in the art.

Figure 1:
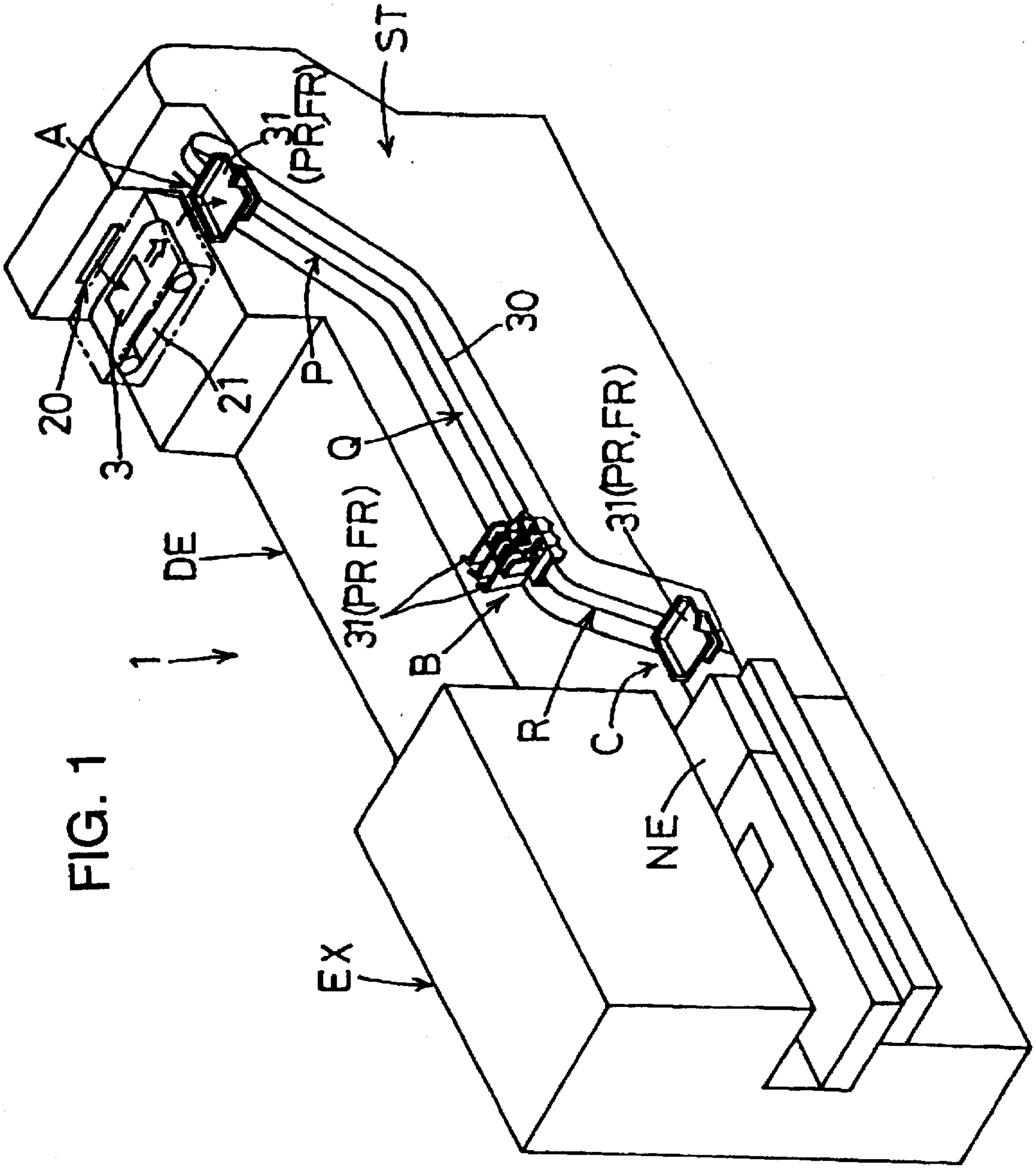
FIG. 1 is a schematic illustration of an integrated photofinishing apparatus in accordance with an embodiment of the invention.

Referring to the drawings in detail, and in particular, to FIG. 1, an integrated photofinishing apparatus 1 in accordance with an embodiment of the invention includes an exposure apparatus EX where a continuous web of photographic paper 3 is exposed to a negative film 2 to form a latent image frame by frame, a photofinishing apparatus DE for development, bleaching, fixation and stabilization, and a sorting apparatus ST for cutting the photofinished paper 3 into individual prints.

Figure 2:
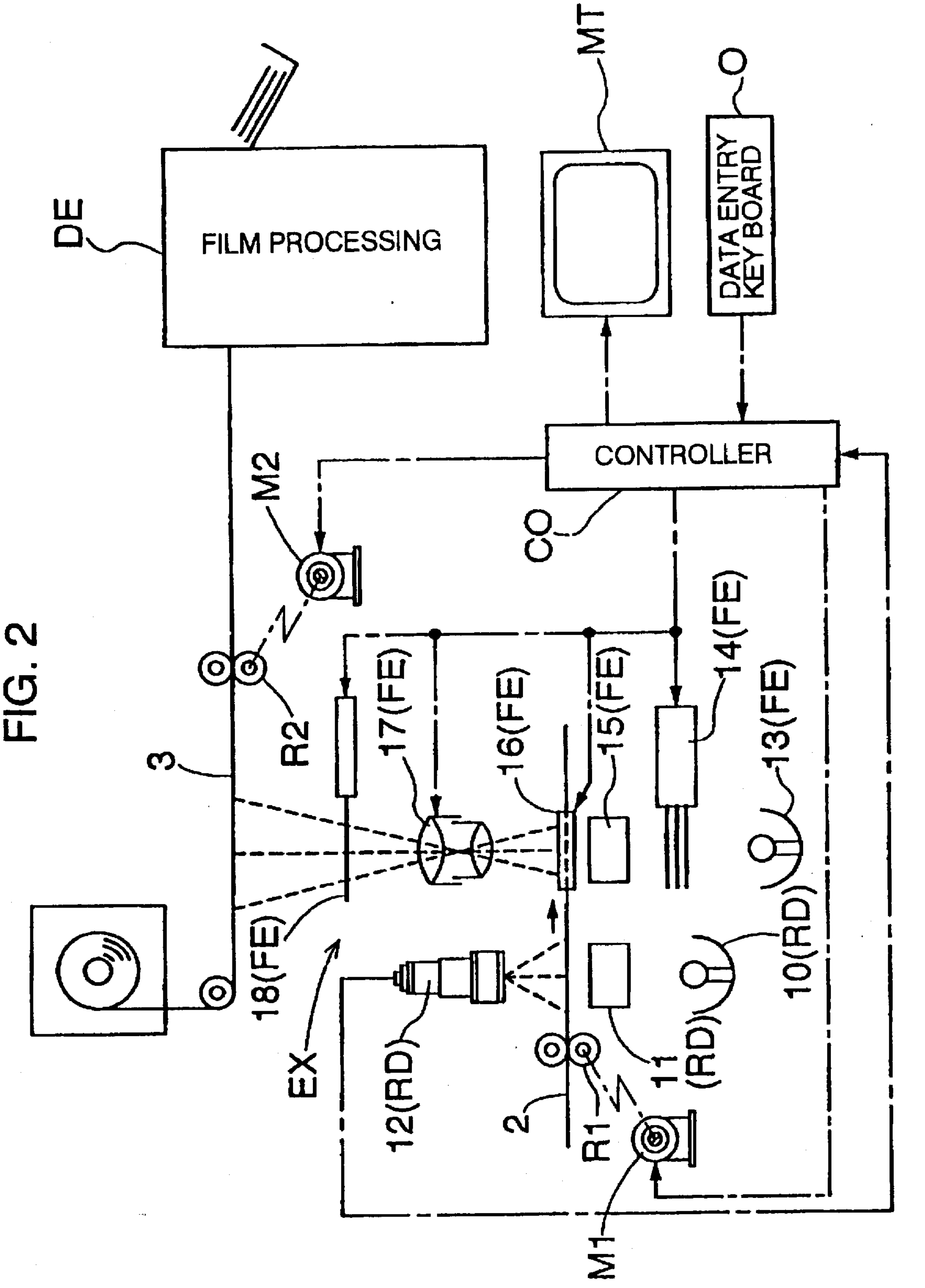
FIG. 2 is a schematic illustration of an exposure apparatus of the integrated photofinishing apparatus shown in FIG. 1.

As shown in FIG. 2 in detail, in the exposure apparatus EX, there are provided an image reading system RD and an exposure system FE in order from the upstream end of film transportation. The image reading system RD includes a light source 10, a mirror box 11 and a photoelectric image pick-up device 12. The exposure system FE, located downstream from the image reading system RD as viewed in the direction of film transportation, includes a light source 13, a color correction filters 14, a mirror box 15, negative mask 16, a printing lens 17 and a shutter 18. A continuous web of photographic paper 3 is withdrawn out of a paper magazine and transported by means of rollers R2 driven by an electric motor M2. A negative film 2 having, for instance, 12, 24 or 36 image frames, is transported through the image reading system RD and an exposure system FE by means of rollers R1 driven by an electric motor M1. The image reading system RD and the exposure system FE per se are well known in various types in the photographic art and may take any known type.

The photoelectric image pick-up device 12 picks up an image of each frame of the negative film 2 and provides and sends video data of the image to a controller CO which governs operation of the whole integrated photofinishing apparatus 1. The controller CO automatically determines an exposure condition on the basis of the video data and, when the negative film 2 reaches a position where the frame is located at the negative mask 16 of the exposure system FE, the controller CO controls the color correction filters 14 and shutter 18 on the exposure condition to make a proper exposure of the photographic paper 3 to the negative film 2. In this instance, the integrated photofinishing apparatus 1 is equipped in the exposure apparatus EX with a color monitor MT on which the controller CO displays an image detected by the image reading system RD for simulation of a picture expected to be printed on the photographic paper 3. An operator observes the displayed image and may, if necessary, enter data for a correction of the exposure condition through a data entry key board O. The exposure is continually made one after another. Following the exposure, the photographic paper 3 is further transported to the photofinishing apparatus DE. When all image frames of the negative film 2 have been exposed, the negative film 2 is further transported to a film cutting and inserting apparatus NE (see FIG. 1) where the negative film 2 is automatically cut into several negative strips, each strip having four or six frames, and the negative strips are automatically inserted into a negative holder (see FIG. 5).

The integrated photofinishing apparatus 1 has a plurality of processing tanks (not shown) in the photofinishing apparatus DE and moves the exposed photographic paper 3 through each of the processing tanks for processing in a well known manner. After the processing, the photographic paper 3 is dried and cut into individual prints. Each print 3 is ejected through an ejection slot 20 and placed on a print delivery conveyer 21 extending between the ejection slot 20 and a sorting apparatus ST disposed at one side of the integrated photofinishing apparatus 1. When all prints belonging a specific negative film 2 are ejected and piled on one after another on the print conveyer 21, the cluster of prints 3A is transferred to the sorting apparatus ST.

Figure 3:
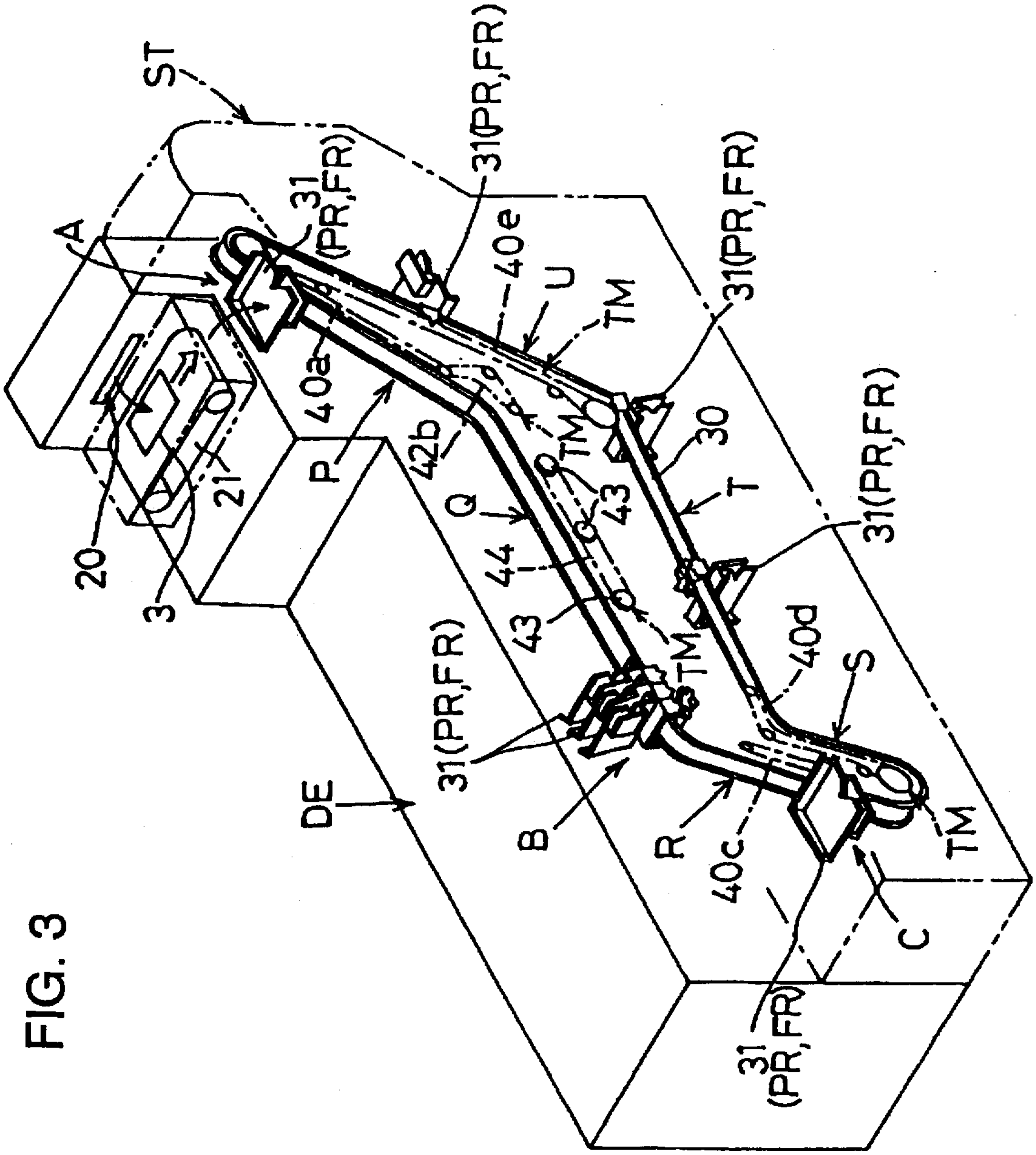
FIG. 3 is a perspective view of an essential part of the integrated photofinishing apparatus shown in FIG. 1.
Figure 4:
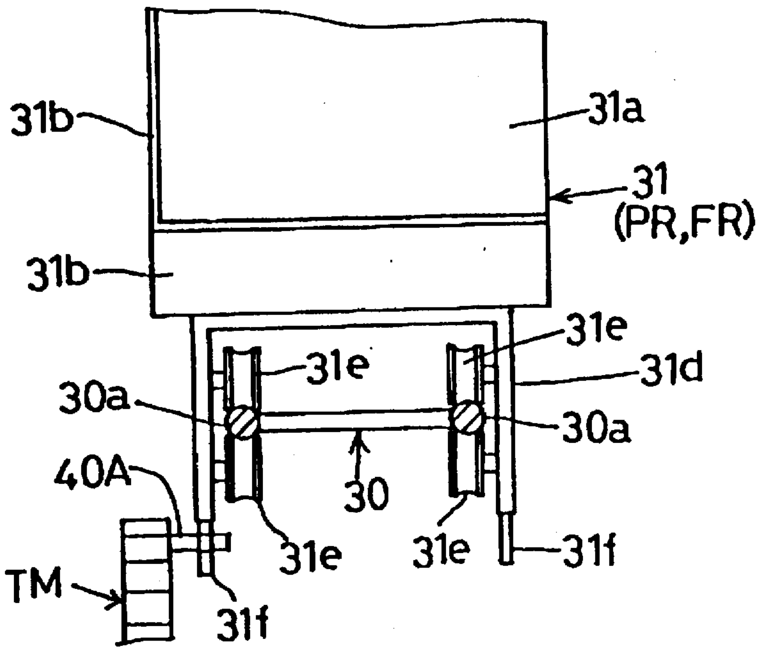
FIG. 4 is an enlarged view showing a receptacle guide and a receptacle.
Figure 5:
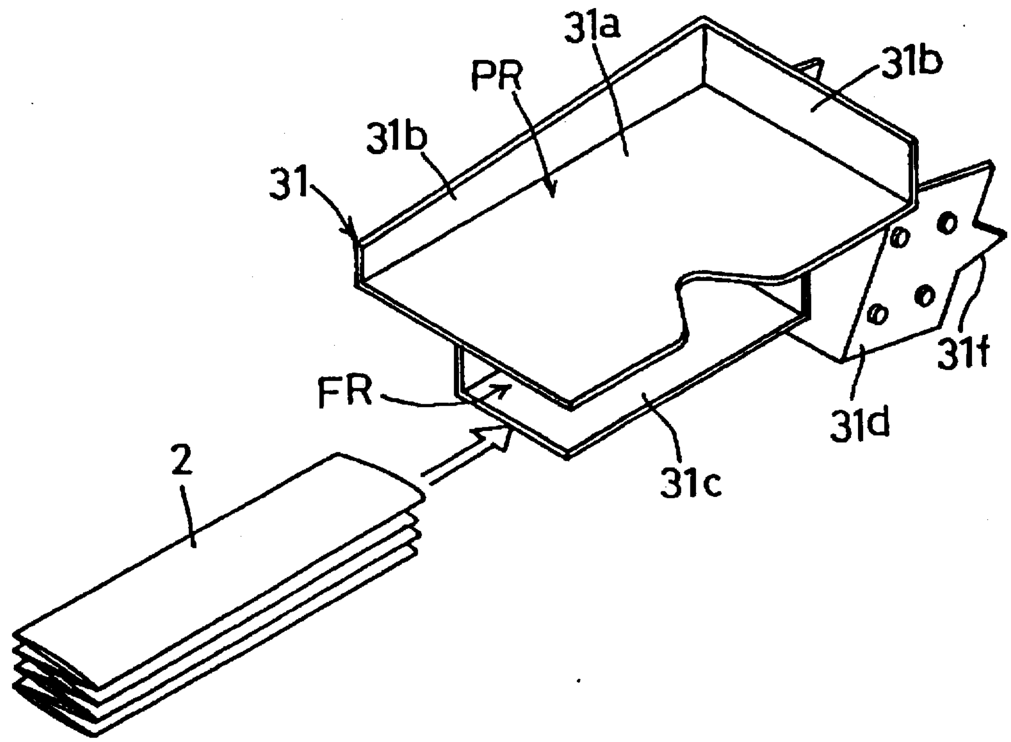
FIG. 5 is a perspective view showing a receptacle.

As shown in FIGS. 3 to 5, the sorting apparatus ST for putting a specific negative film 2 and a cluster of prints 3A belonging to the negative film 2 together includes an endless receptacle guide 30 formed in a closed loop, a number of integral receptacles 31 and receptacle drive means TM. The receptacle guide 30 comprises an endless guide belt integrally formed at both sides with guide rails 30*a* each of which has a circular cross section. The receptacle guide 30 extends between the sorting apparatus ST and the film cutting and inserting apparatus NE to form a closed loop path for the receptacles 31. The receptacle 31 is formed as an integral unit of an upper print receptacle PR and a lower negative film receptacle FR for receiving, respectively, a cluster of prints and a negative film 2 in a film holder. Specifically, the upper print receptacle PR comprises a print support plate 31*a* formed with side frames 31*b* on which a cluster of prints are placed and a film holder support 31*c* on which a negative film 2 in a film holder is placed. These support plates 31*a* and 31*c* are formed as an integral receptacle 31. The integral receptacle 31 is provided with a generally U-shaped support frame 31*d* secured to the under side thereof. The support frame 31*d* rotatably supports two pair of rollers 31*e* inside the support frame 31*d*. Each pair of rollers 31*e* hold the guide rail 30*a* therebetween and roll along the guide rail 30*a*. The support frame 31*d* at its lower ends has linking legs 31*f* engageable with the receptacle drive means TM.

Figure 6:
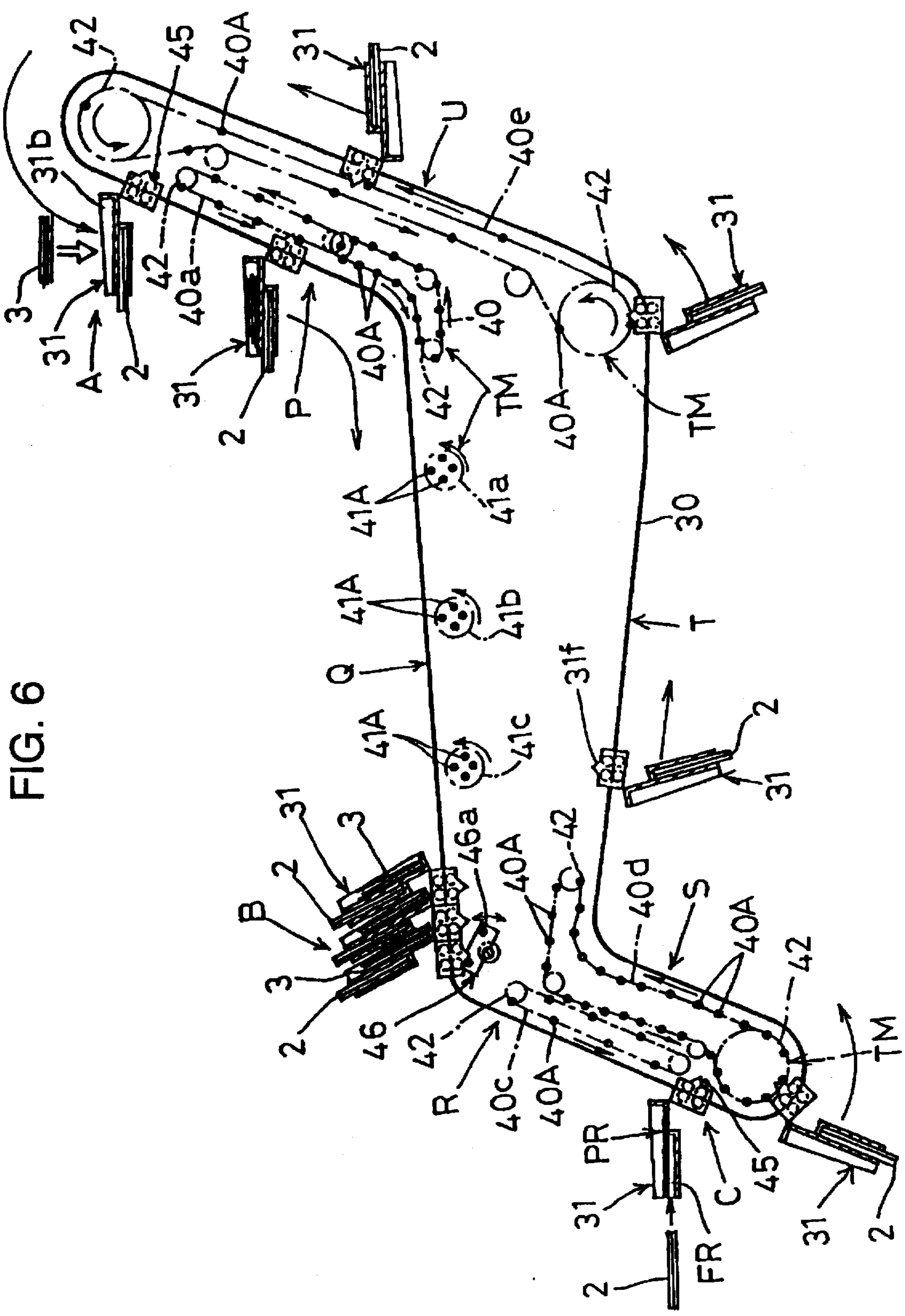
FIG. 6 is a side view of a sorting apparatus of the integrated photofinishing apparatus shown in FIG. 1.

As shown in detail in FIG. 6, the receptacle drive means TM includes first to fifth drive chains 40a–40e, each of which extends along part of the receptacle guide 30 and is driven by a drive sprocket 42. The receptacle drive means TM further includes first to third rollers 41a–41c disposed between the second and third conveyer chains 40b and 40c, each roller 41a–41c being linked to drive sprockets 43 (see FIG. 3). These sprockets 43 are linked by means of a chain 44. All of the drive sprockets 42 and at least one of the drive sprockets 43 are driven by means of motors (not shown). Each of the conveyer chains 40a–40e is provided with a number of linking pins 40A projecting laterally and engageable with the linking leg 31f of the support frame 31d of the receptacle 31. On the other hand, each of the rollers 41a–41c is provided with a plurality of linking pins 41A engageable with the linking leg 31f. In place of the drive rollers 41a–41c and drive sprockets 43, a drive chain may be installed along the receptacle guide 30 between the second conveyer chain 40b and the waiting position B. In this case, magnet blocks are secured to the support frame 31d of the receptacle 31 so as to magnetically couple the receptacle 31 to the drive chain.

The first conveyer chain 40a extends along a first sharply-sloped path P of the receptacle guide 30 from a print loading station A where the receptacle 31 receives a cluster of prints and a middle position of the first sharply-sloped path P. The second conveyer chain 40b extends along the first sharply-sloped path P of the receptacle guide 30 from the middle position to a position in close proximity to one end of a first gently-sloped path Q of the receptacle guide 30. The rollers 41a–41c are disposed at regular intervals below the first gently-sloped path Q. The third conveyer chain 40c extends along a second sharply-sloped path R of the receptacle guide 30 from a waiting station B provided at an end of the first gently-sloped path Q where receptacles 31 wait ready for service to a position in close proximity to the lower end of the second sharply-sloped path R where a negative film loading station C is provided. The forth conveyer chain 40d extends along a third sharply-sloped path S of the receptacle guide 30 from a lower end of the third sharply-sloped path S to a position across over a transitional point between the third sharply-sloped path S and a second gently-sloped path T of the receptacle guide 30. The fifth conveyer chain 40e extends along a fourth sharply-sloped path U of the receptacle guide 30 from an end of the second gently-sloped path T to the top of the fourth sharply-sloped path U of the receptacle guide 30.

At the print loading station A, an integral receptacle 31 is held so that the upper print receptacle PR is directed upward with the side frame 31b positioned slightly below the upper surface of the print conveyer 21. Part of the receptacle guide 30 between the third and fourth conveyer chains 40c and 40d provides the negative film loading station C where a receptacle 31 receives a negative film 2 in a film holder. This negative film loading station C is located in close proximity to the film cutting and inserting apparatus NE (see FIG. 1). In order to hold a receptacle 31 in each of the print loading station A and the negative film loading station C, the sorting apparatus ST is equipped with means for stopping and holding a receptacle 31. Both stopper devices 45 have the same structure and operation.

Figure 7:
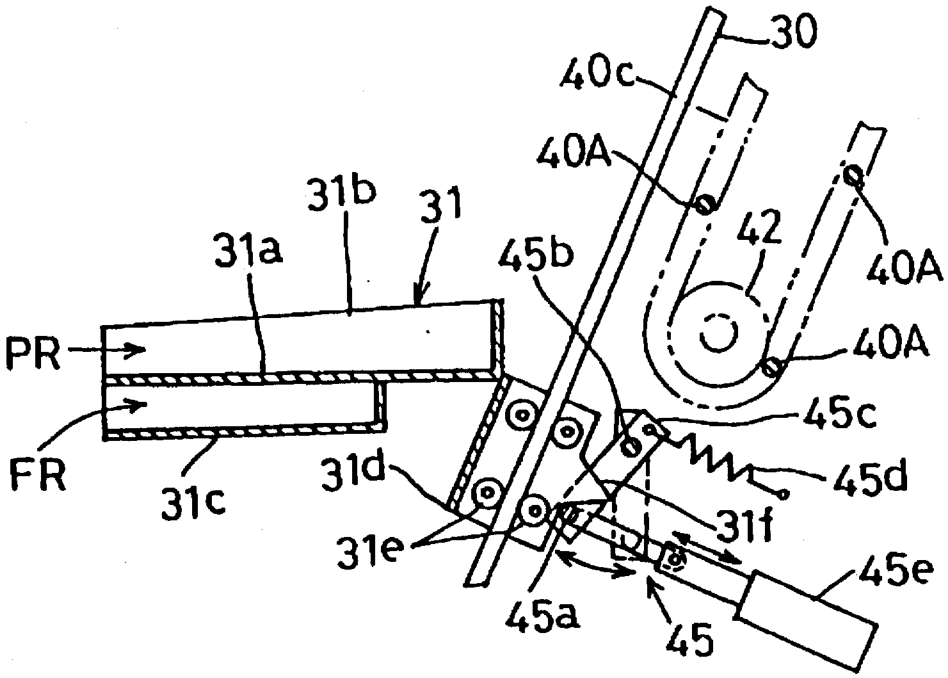
FIG. 7 is a side view showing a stopper device installed at a film loading station.

FIG. 7 shows a stopper device 45 installed in, for instance, the negative film loading station C. The stopper device 45 comprises a linear solenoid 45e, a swingable arm 45c and a spring 45d. The swingable arm 45c is pivoted on a pivot shaft 45b at its one end where the spring 45d is engaged and linked with the linear solenoid 45e at another end where a linking pin 45a engageable with the linking leg 31f of the support frame 31d of a receptacle 31 is secured. While the linear solenoid 45e is not energized, the spring 45d forces the swingable arm 45c in a clockwise direction to bring the linking pin 45a into engagement with the support frame 31d, holding the receptacle 31 in the negative film loading station C. When the linear solenoid 45e is energized, it turns the swingable arm 45c in a counterclockwise direction to disengage the linking pin 45a from the support frame 31d so as to allow the receptacle 31 to slide down on the receptacle guide 30 by its own weight.

Figure 8:
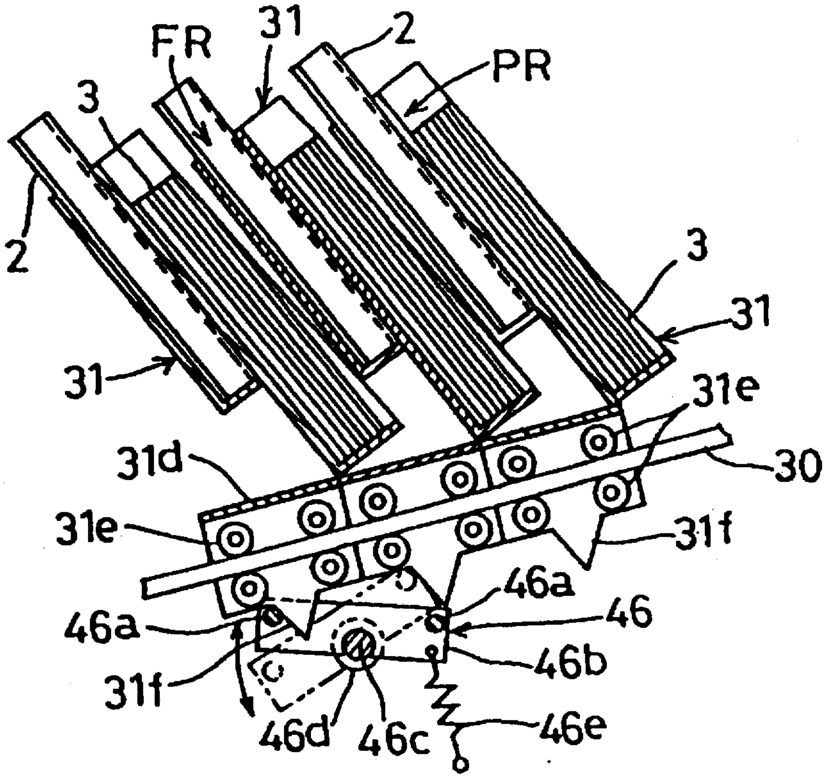
FIG. 8 is a side view showing a stopper device installed at a waiting station.
Figure 9:
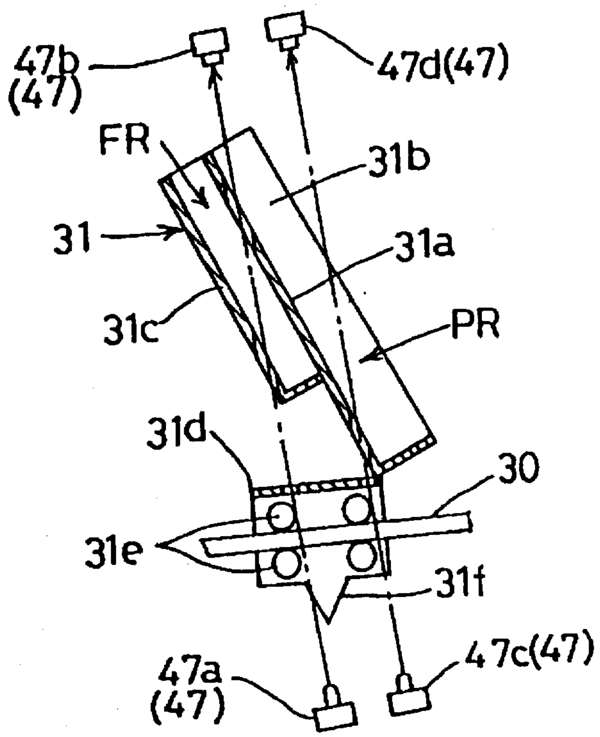
FIG. 9 is an illustration of photoelectric sensors installed at a print loading station.

FIG. 8 shows another stopper device 46 provided in the waiting station B. The stopper device 46 comprises a rotary solenoid 46d, a swingable arm 46b and a spring 46e. The swingable arm 46b is pivoted on a pivot shaft 46c at its middle position. The swingable arm 46b is provided with front and rear linking pins 46a secured to front and rear ends thereof, respectively, and engageable with the linking leg 31f of the support frame 31d of an receptacle 31. The swingable arm 46b is engaged at its one end by the spring 46e so as to turn in the clockwise direction and linked at the middle with the rotary solenoid 46d. While the rotary solenoid 46d is not energized, the spring 46e forces the swingable arm 46b in the clockwise direction to bring the front linking pin 46a into engagement with the linking leg 31f of the support frame 31d of the foremost receptacle 31, holding the foremost receptacle 31 in the waiting station B. Accordingly, subsequent receptacles 31 lean against one after another so as to be stopped in the waiting station B. When the linear solenoid 46d is energized, it turns the swingable arm 46b in the counterclockwise direction to disengage the front linking pin 46a from the support frame 31d as shown by a broken line so as to allow the foremost receptacle 31 to slide down on the receptacle guide 30 by its own weight. Simultaneously, the swingable arm 46b brings the rear linking pin 46a into engagement with linking leg 31f of the support frame 31d of the subsequent receptacle 31 as shown by a broken line so as to prevent the subsequent receptacle 31 from sliding down. When the linear solenoid 46d is deenergized again, it is forced to turn in the clockwise direction to disengage the rear linking pin 46a from the support frame 31d. Consequently, the subsequent receptacle 31 slides down by its own weight along the receptacle guide 30 until it is stopped by means of engagement between the linking leg 31f and the linking pin 46a. In this manner, only the foremost one of receptacles 31 in a stack in the waiting station is released every time the rotary solenoid 46d is energized.

In each of the print loading station A and the waiting station B, there are two sets of photoelectric sensors 47 for detecting a negative film 2 in a film holder and a cluster of prints, respectively. Each photoelectric sensor 47 comprises a light emitting diode 47a, 47c and a light receiving element 47b, 47d. The receptacle 31 is formed with holes (not shown) through which light beams emanating from the light emitting diodes 47a and 47c pass to the light receiving elements 47b and 47d.

In operation of the integrated photofinishing apparatus 1, when an integral receptacle 31 with negative film strips 2 in a film holder put on the negative film receptacle FR is positioned at the print loading station A, the receptacle 31 receives a stack of prints transported by the print conveyer 21. These prints have been made from a negative film 2 from which the negative strips have been cut off and inserted into the film holder at the negative film loading station C adjacent to the film cutting and inserting apparatus NE. When the photoelectric sensor 47 detects the prints on the receptacle 31 at the print loading station A, the stopper 45 at the print loading station A is actuated to energize the linear solenoid 45e, releasing the linking pin 45a from the linking leg 31f of the support frame 31d of the receptacle 31. Consequently, the receptacle 31 slides down to the upper end of the first conveyer chain 40a by its own weight. At the upper end of the first conveyer chain 40a, the receptacle 31 is linked to the first conveyer chain 40a together by means of engagement between the linking leg 31f of the support frame 31d of the receptacle 31 and one of the linking pins 40A of the first conveyer chain 40a. Consequently, the receptacle 31 slides down on the receptacle guide 30 following movement of the first conveyer chain 40A. In this instance, the first conveyer chain 40a is changed between continuous movement and intermittent movement according the number of receptacles 31 on the first gently-sloped path Q. In the intermittent movement, the first conveyer chain 40a moves a distance equal to one pitch of the linking pins 40A following every actuation of the stopper 45. The receptacle 31 is transferred to the second conveyer chain 40b from the first conveyer chain 40a and linked to the second conveyer chain 40b by means of engagement between the linking leg 31f of the support frame 31d of the receptacle 31 and one of the linking pins 40A of the second conveyer chain 40b. Thereafter, the receptacle 31 is forwarded by the second conveyer chain 40b to the end of the first gently-sloped path Q where the receptacle is released from the second conveyer chain 40b. When the receptacle 31 slides down to the first roller 41a on the receptacle guide 30 along the first gently-sloped path Q by gravity, it is linked to the first roller 41a through engagement between the linking pin 41A of the roller 41a and the linking leg 31f of the support frame 31d of the receptacle 31. The roller 41a accelerates and expels the receptacle 31 toward the second roller 41b. In the same manner, the receptacle 31 is accelerated by the second and third rollers 41b and 41c and forced along the first gently-sloped path Q toward the waiting station B. The receptacle 31 is stopped by the stopper 46 in the waiting station B for removal of the negative film 2 and prints as one cluster by an operator. If there is a preceding receptacle 31 held stopped in the waiting station B, the receptacle 31 is stopped by the preceding receptacle 31. Every time the negative film receptacle FR of a preceding receptacle 31 is loaded with a negative film 2 inserted in a film holder at the negative film loading station C, following or simultaneously with advancement of the third conveyer chain 40c by a distance equal to one pitch of the linking pins 40A, the stopper 46 is actuated to release a foremost receptacle 31 in the waiting station B on condition that the photoelectric sensor 47 detects that the receptacle 31 is empty so as to cause the foremost empty receptacle 31 to slide down to the third conveyer chain 40c on the receptacle guide 30 along the second sharply-sloped path R by gravity. In this instance, the loading of a negative film 2 in a film holder to an empty receptacle 31 is detected by means of a sensor (not shown) like the photoelectric sensor 47. The empty receptacle 31 is linked to the third conveyer chain 40c through engagement between the linking pin 40A of the third conveyer chain 40c and the linking leg 31f of the support frame 31d of the receptacle 31 and forwarded toward the negative film loading station C.

While an empty receptacle 31 is loaded with a negative film 2 in a film holder, the third conveyer chain 40c at its linking pins 40A holds a plurality of empty receptacles 31. If there is no empty receptacle 31 held ready for receiving a negative film 2 in a film holder in the second sharply-sloped path R, the stopper 46 is actuated to release empty receptacles 31 one after another in spite of existence of a receptacle positioned at the negative film loading station C, following advancement of the third conveyer chain 40c by a distance equal to one pitch of the linking pins 40A. This occurs when the loading of a negative film 2 to receptacle 31 at the negative film loading station C is made faster than the removal of a cluster of negative film and prints from a integral receptacle 31 in the first gently-sloped path Q. Consequently, at least more than two receptacles 31 are always held ready in the second sharply-sloped path R.

A negative film folder is automatically, or otherwise manually, folded in the film cutting and inserting apparatus NE and delivered and placed onto the negative film receptacle FR of an empty receptacle 31 at the negative film loading station C. The receptacle 31 with a negative film 2 in a film holder received in the negative film receptacle FR is transferred to the fourth conveyer chain 40d from the third conveyer chain 40c and linked to the fourth conveyer chain 40d by means of engagement between the linking leg 31f of the support frame 31d of the receptacle 31 and one of the linking pins 40A of the fourth conveyer chain 40d. Thereafter, the receptacle 31 is moved upward along the third sharply-sloped path S by the fourth conveyer chain 40d to the end of the second gently-sloped path T. Once the receptacle 31 is placed in the second gently-sloped path T, it slides down on the receptacle guide 30 along the second gently-sloped path T by gravity to the lower end of the fifth conveyer chain 40e where the receptacle 31 is linked by engagement between the linking leg 31f of the support frame 31d of the receptacle 31 and one of the linking pins 40A of the fifth conveyer chain 40e and moved to the top of the fourth sharply-sloped path U of the receptacle guide 30. Since the film holder with the negative film 2 held therein expands in the negative film receptacle FR sufficiently, while the receptacle 31 is sliding down on the receptacle guide 30 along the second gently-sloped path T, it holds the negative film in the film holder and prevents it from slipping out as shown in FIG. 6.

At the end of the second gently-sloped path T, the receptacle 31 is linked to the fifth conveyer chain 40e by engagement between the linking leg 31f of the support frame 31d of the receptacle 31 and one of the linking pins 40A of the fifth conveyer chain 40e. Every time the stopper 45 releases the receptacle 31 at the print loading station A, the fifth conveyer chain 40e forces the receptacle 31 linked thereto upward by a distance equal to one pitch of the linking pins 40A. Consequently, every time the stopper 45 is actuated it releases a receptacle 31 with a negative film 2 in a film holder and a cluster of prints held therein and permits the same to slide down on the receptacle guide 30 along the first sharply-sloped path P from the print loading station A. A subsequent receptacle 31 with a negative film 2 in a film holder held therein is positioned in the print loading station A and stopped and held ready for receiving a cluster of prints by the stopper 45. If the photoelectric sensor 47 at the print loading station A detects no film holder in the receptacle 31, the stopper 45 is actuated to cause the empty receptacle 31 to slide down on the receptacle guide 30 along the first sharply-sloped path P without receiving prints.

The sorting apparatus ST is adapted to timely position a receptacle 31 with a specific negative film held therein in the print loading station A before the photofinishing apparatus DE cuts the photographic paper 3 exposed to the specific negative film and processed into individual prints and delivers the prints onto the print conveyer 21.

Figure 10:
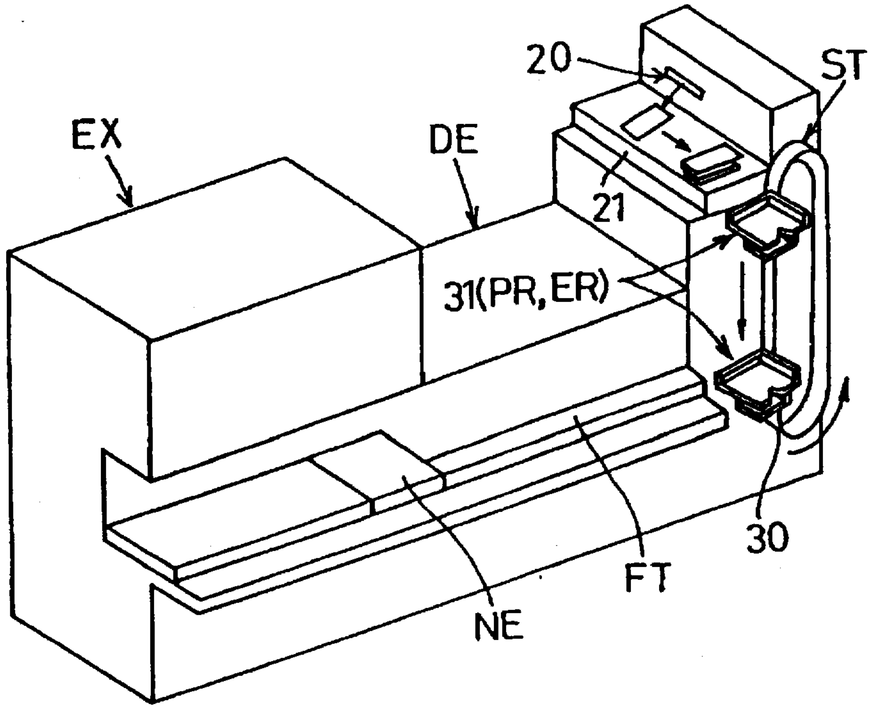
FIG. 10 is a schematic illustration of an integrated photofinishing apparatus in accordance with another embodiment of the invention.

FIG. 10 shows an integrated photofinishing apparatus according to another embodiment of the invention. The an integrated photofinishing apparatus is equipped with a negative film transporting apparatus FT, such as a belt conveyer, to transport a negative film 2 in a film holder from a film cutting and inserting apparatus NE to a position below a print conveyer 21. A sorting apparatus ST includes a closed loop receptacle guide 30 extending between the print conveyer 21 and an end of the negative film transporting apparatus FT far from the film cutting and inserting apparatus NE.

Figure 11:
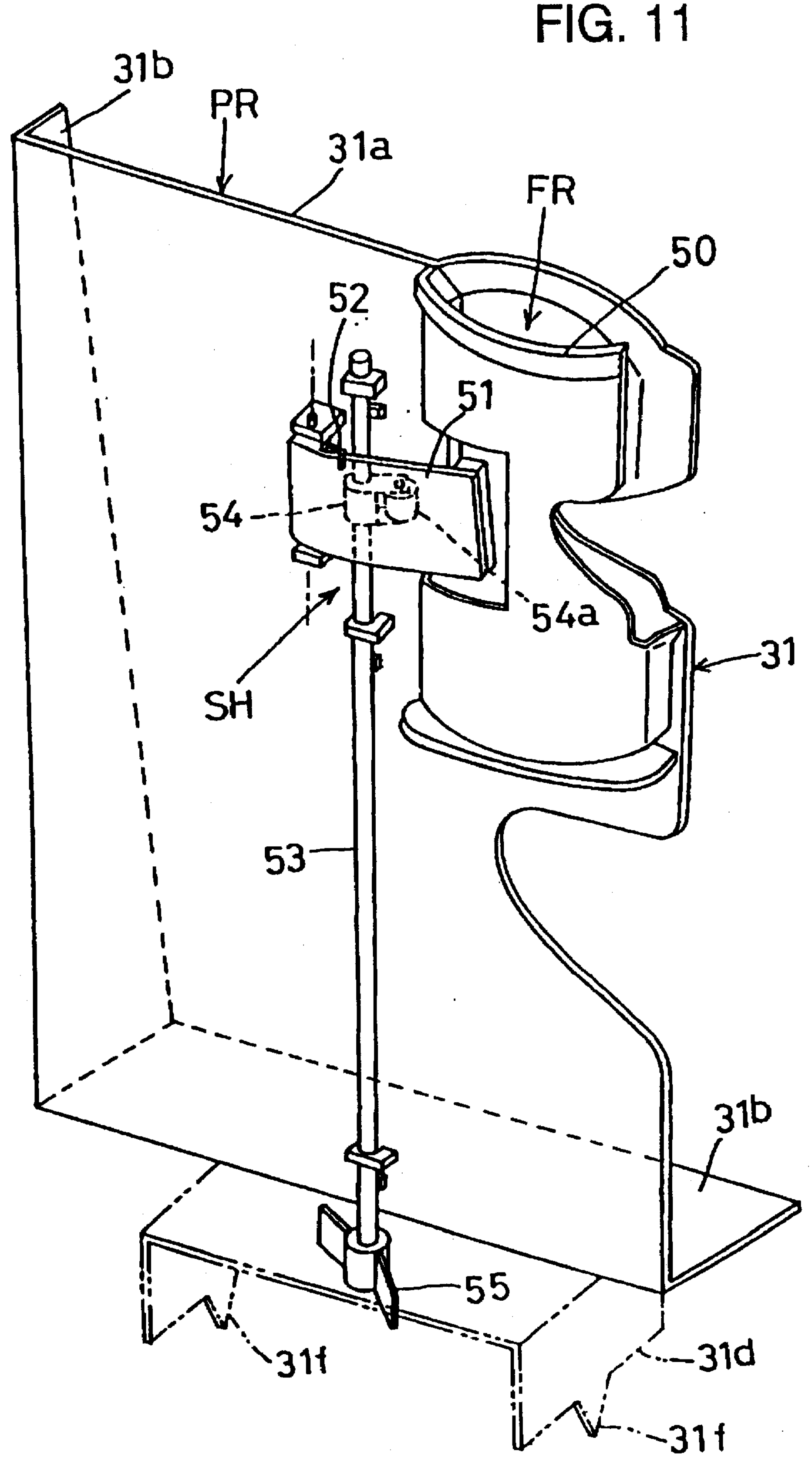
FIG. 11 is a perspective view showing a film retainer.
Figure 12A:
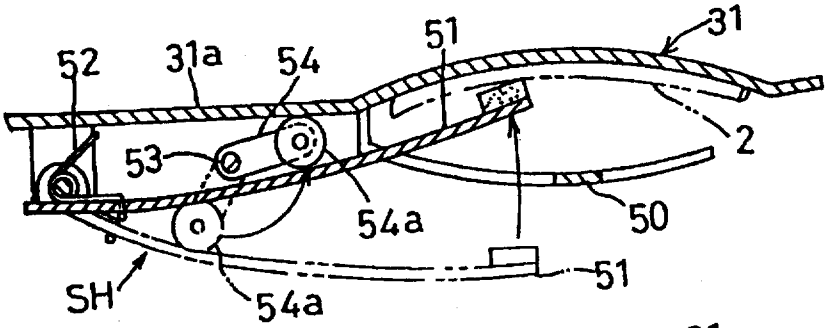
FIG. 12A is an explanatory illustration of a film retainer arm in a retaining position.
Figure 12B:
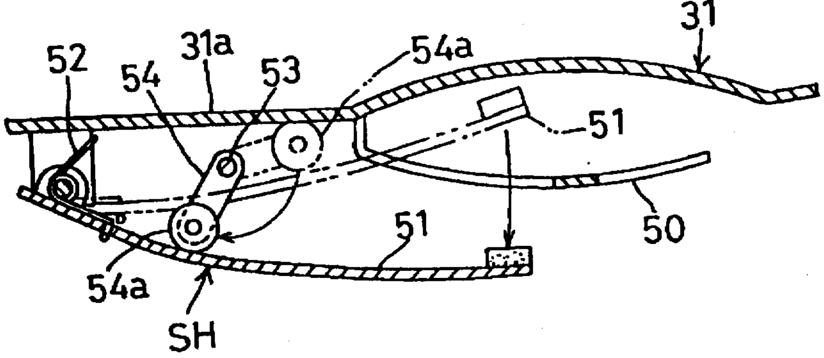
FIG. 12B is an explanatory illustration of the film retainer arm in a release position.
Figure 13:
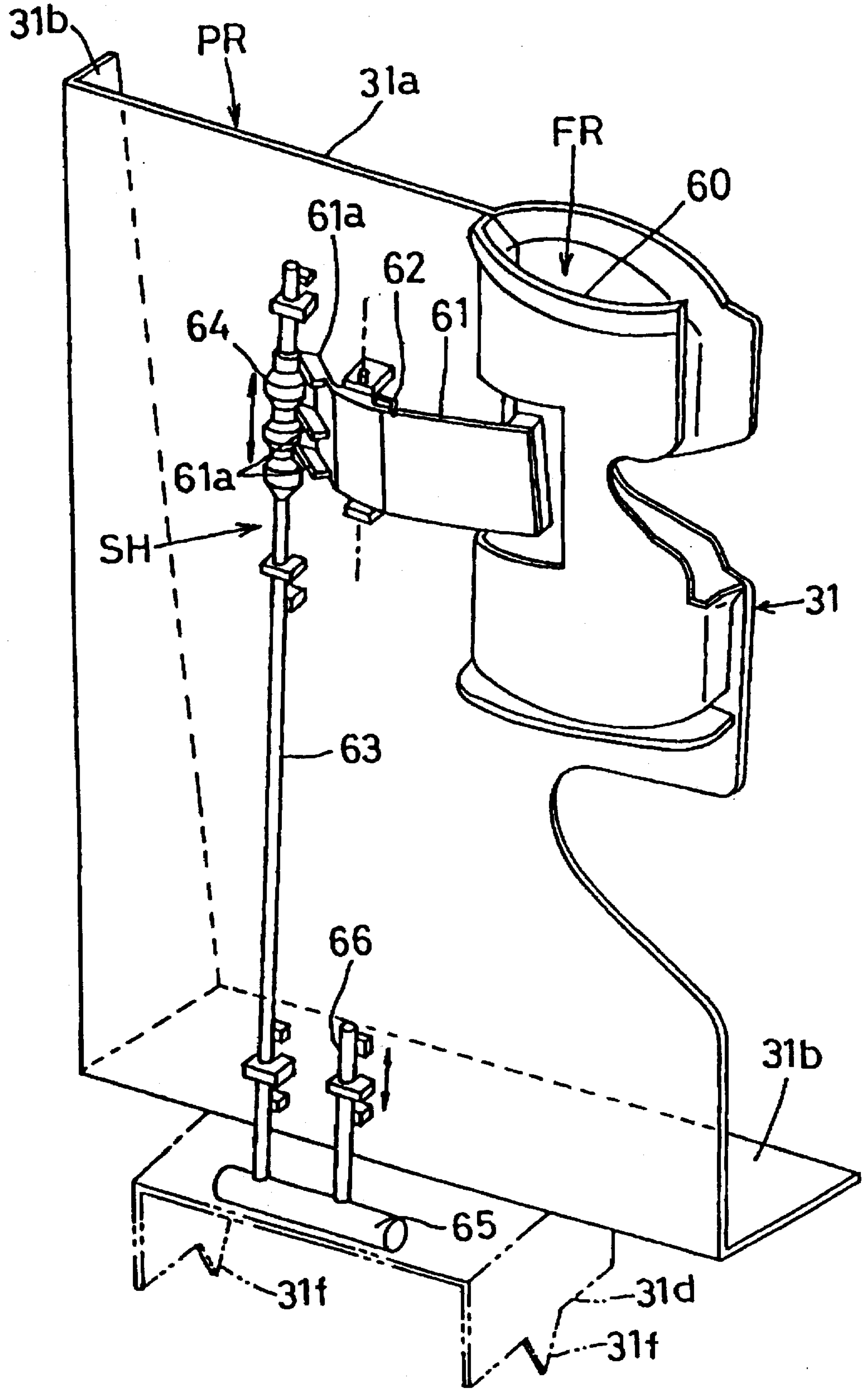
FIG. 13 is a perspective view showing a modification of the film retainer.

Each receptacle 31 may be equipped with a film holder retainer SH for securely retaining a film holder in a film receptacle as shown in FIG. 11 or 13. Specifically, as shown in FIG. 11, the film holder retainer SH comprises a support frame 50 secured to one of the corners of a support plate 31*a* of the receptacle 31 for providing a negative film holder receiving space FR, a retainer arm 51 pivotally mounted on the support plate 31*a* of the receptacle 31 for retaining a negative film 2 in a film holder received in the support frame 50, and a release shaft 53 rotatably attached to the support plate 31*a* of the receptacle 31 for turning the retainer arm 51 to allow a negative film 2 in a film holder to be removed from the support frame 50. The support frame 50 is formed with an opening for allowing the retainer arm 51 to get access to a negative film 2 in a film holder received in the support frame 50. The retainer arm 51 is ordinarily urged by a coil spring 52 to press down the negative film 2 in a holder received in the support frame 50 as shown in FIG. 12A. The release shaft 53 is provided with a push roller 54*a* secured to a part thereof where it is overlapped by the retainer arm 51 and an actuator leg 55 secured to one end thereof in proximity to a support frame 31*d* of the receptacle 31. The retainer arm 51 is ordinarily urged by the coil spring 52 to press down the film holder received in the support frame 50. When turning the release shaft 53, the push roller 54*a* pushes up the retainer arm 51 against the coil spring 52 to a release position shown in FIG. 12B where the retainer arm 51 releases the film holder from a retaining position shown in FIG. 12A where the retainer arm 51 retains the film holder in the support frame 50.

Figure 12C:
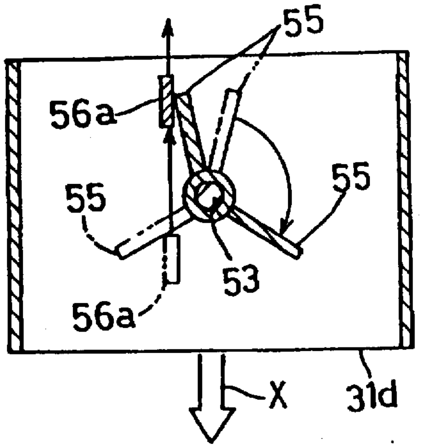
FIG. 12C is an explanatory illustration of a release shaft of the film retainer in the retaining position.
Figure 12D:
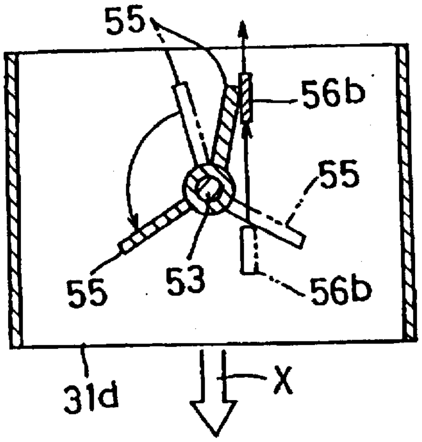
FIG. 12D is an explanatory illustration of the release shaft of the film retainer in the release position.

In order to turn the release shaft 53, the sorting apparatus ST is provided with guide legs 56*a* and 56*b* secured to the receptacle guide 30. The guide leg 56*a* for retention is in close proximity to a position where the lower end of the fourth conveyer chain 40*d* is located below the film loading station C. The guide leg 56*b* for release is in a position where the second conveyer chain 40*b* terminates in close proximity to the starting end of the first gently-sloped path Q. As shown in FIGS. 12C and 12D, when the receptacle 31 moves in a direction shown by an arrow X from the release position where the guide leg 56*a* takes a position shown by a broken line in FIG. 12C, the guide leg 56*a* is brought into engagement with the actuator leg 55 of the release shaft 53 and subsequently pushes and turns the release shaft 53 in a clockwise direction through the engagement between the guide leg 56*a* and the actuator leg 55 as shown by a solid line in FIG. 12C. As a result, the retainer arm 51 takes the retaining position shown in FIG. 12A. On the other hand, when the receptacle 31 moves in a direction shown by an arrow X from the retaining position where the guide leg 56*b* takes a position shown by a broken line in FIG. 12D, the guide leg 56*a* is brought into engagement with the actuator leg 55 of the release shaft 53 and subsequently pushes and turns the release shaft 53 in a counterclockwise direction through the engagement between the guide leg 56*b* and the actuator leg 55 as shown by a solid line in FIG. 12D. As a result, the retainer arm 51 takes the release position shown in FIG. 12B.

Figure 14A:
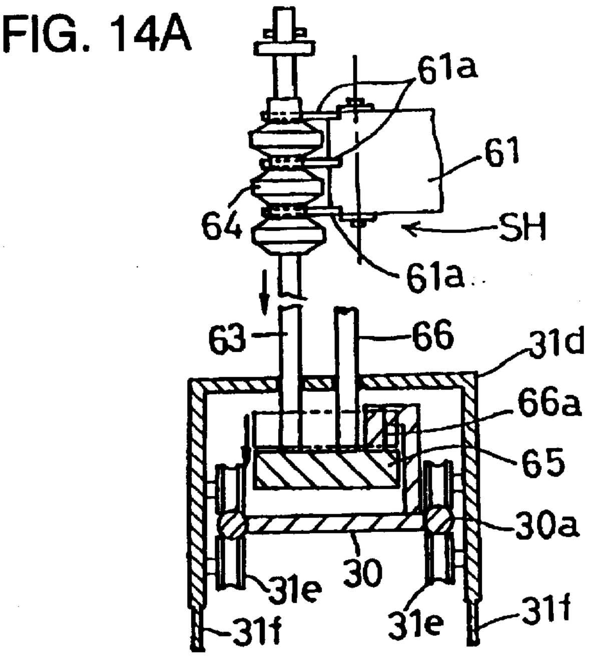
FIGS. 14A and 14B are explanatory illustrations of the film retainer in a release position.
Figure 14C:
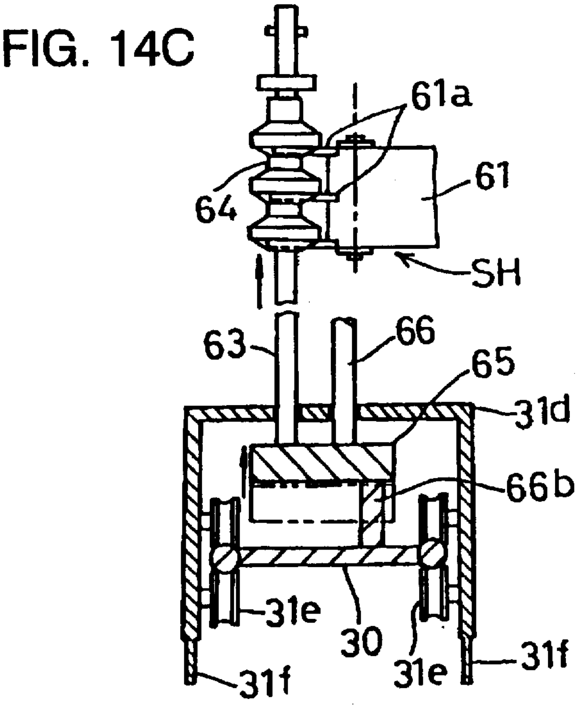
FIGS. 14C and 14D are explanatory illustrations of the film retainer in a retaining position.
Figure 15A:
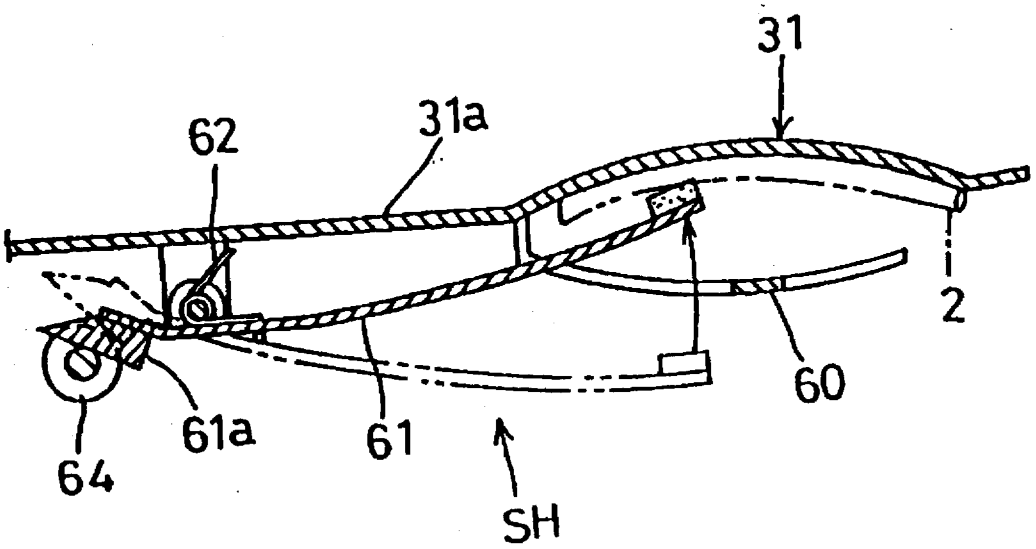
FIG. 15A is an explanatory illustration of a film retainer arm in the retaining position.
Figure 15B:
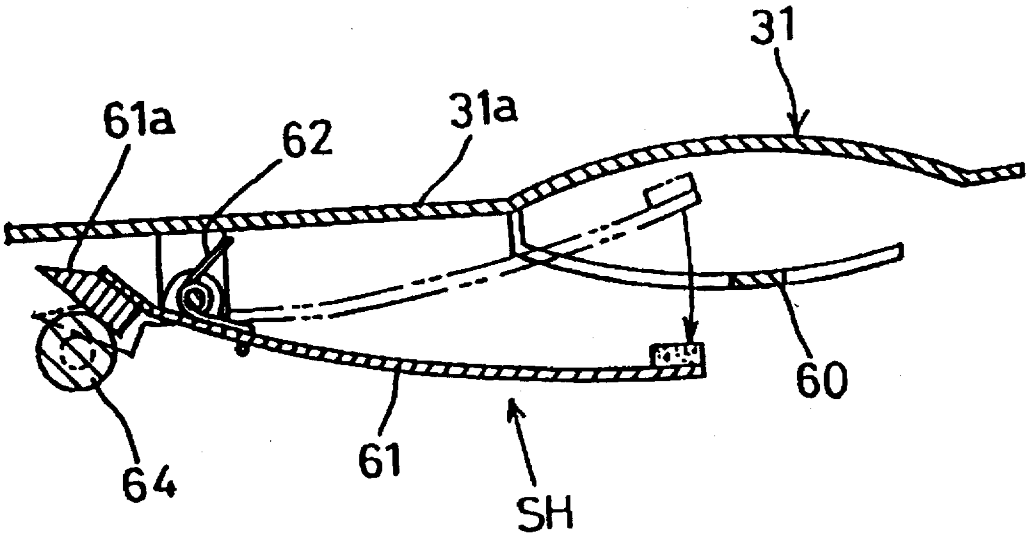
FIG. 15B is an explanatory illustration of the film retainer arm in the release position.

FIG. 13 shows a modification of the film holder retainer SH. This film holder retainer SH comprises a support frame 60 secured to one of corners of a support plate 31*a* of the receptacle 31 for providing a negative film holder receiving space FR, a retainer arm 61 pivotally mounted on the support plate 31*a* of the receptacle 31 for retaining a negative film 2 in a film holder received in the support frame 60, and a slidable release shaft 63 attached to the support plate 31*a* of the receptacle 31 for turning the retainer arm 61 between retaining and release positions. The retainer arm 61 is ordinarily urged by a spring 62 to press down a negative film 2 in a film holder received in the support frame 60. The release shaft 63, which is slidable in a direction in which the receptacle 31 moves, is provided with a surface cam member 64 secured thereto at a position adjacent to the retainer arm 61 and an actuator rod 65 secured to one end thereof in proximity to a support frame 31*d* of the receptacle 31. The film holder retainer SH is further provided with a slidable guide shaft 66 secured to the actuator rod 65 for guiding and preventing the release shaft 63 from rotation. The retainer arm 61 is ordinarily urged by the spring 62 to press down the film holder received in the support frame 60. The surface cam member 64 is formed with three peaks and is engaged by three cam followers 61*a* extending from the retainer arm 61. Sliding movement of the release shaft 63 causes the cam followers 61*a* to shift between bottoms and peaks of the surface cam member 64. When locating the cam followers 61*a* at the bottoms of the cam member 64 shown in FIG. 14A, the retainer arm 61 takes a retaining position shown in FIG. 15A where the retainer arm 61 retains a film holder in the support frame 60. On the other hand, when locating the cam followers 61*a* at the peaks of the cam member 64 shown in FIG. 14C, the retainer arm 61 takes a release position against the spring 62 shown in FIG. 15B where the retainer arm 61 releases a film holder so as to allow removal of the film holder from the support frame 60.

Figure 14B:
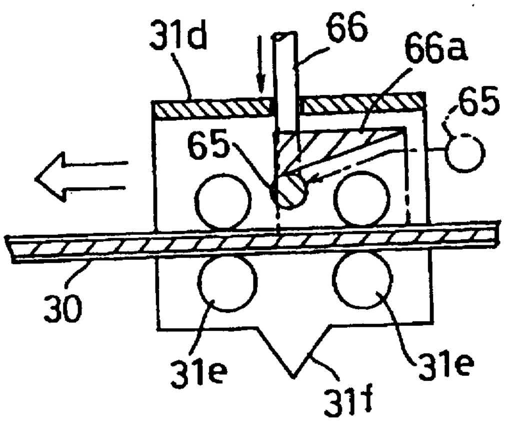
Figure 14D:
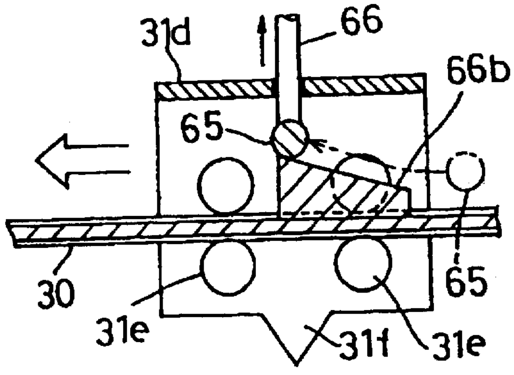

In order to slide the release shaft 63, the sorting apparatus ST is further provided with guide cam 66*a* and 66*b* secured to the receptacle guide 30. The guide cam 66*a* is in close proximity to a position where the lower end of the fourth conveyer chain 40*d* is located below the film loading station C. The guide cam 66*b* is in a position where the second conveyer chain 40*b* terminates in close proximity to the starting end of the first gently-sloped path Q. When the receptacle 31 moves in a direction shown by an arrow from the release position shown in FIG. 14C, the guide cam 66*a* is brought into engagement with the actuator rod 65 of the release shaft 53 and subsequently pushes down the release shaft 63 as shown in FIG. 14B. As a result, the cam followers 61*a* of the retainer arm 51 are brought into engagement with the bottoms of the cam member 64, pivotally moving the retaining arm 61 to the retaining position. On the other hand, when the receptacle 31 moves in a direction shown by an arrow from the retaining position shown in FIG. 14A, the guide cam 66*b* is brought into engagement with the actuator rod 65 of the release rod 63 and subsequently pushes up the release shaft 63 as shown in FIG. 14D with the result of engagement between the cam followers 61*a* of the retainer arm 61 and the peaks of the cam member 64. As a result, the retainer arm 61 is pivotally moved to the release position.

Although, in the above embodiment, the print receptacle PR and the negative film receptacle FR are formed as an integral unit of receptacle 31, these receptacles PR and FR may be formed separately and arranged alternatively in the closed loop of receptacle guide 30. In this case where the receptacles PR and FR are arranged alternatively in the closed loop of receptacle guide 30, the drive means TM drives the alternative receptacles PR and FR such that each print receptacle adjacent to a film receptacle, with a specific negative film loaded thereon from the exposure apparatus EX at the film loading station C, is timely positioned in the print loading station A before a cluster of prints made from the specific negative film are loaded from the print conveyer 21 of the photofinishing apparatus DE. Further, in place of driving the receptacles 31 on the receptacle guide 30, the receptacles 31 to which the receptacle guide 30 are secured may be intermittently moved.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An integrated photofinishing apparatus having at least an exposure apparatus for exposing a continuous web of photographic paper to a negative film and delivering the negative film at a film loading station, a photofinishing apparatus for finishing an exposed part of the photographic paper, cutting the photographic paper into individual prints and delivering a cluster of prints made from the negative film at a print loading station, and a sorting apparatus for sorting the prints according to negative films, said sorting apparatus comprising:

- a plurality of film receptacles, each of which receives a negative film at said film loading station;
- a plurality of print receptacles, each of which receives a cluster of prints at said print loading station;
- a receptacle guide forming a closed loop path in which said film receptacles and said print receptacles are alternatively guided between said film loading station and said print loading station; and
- drive means for driving said film receptacles and said print receptacles in said closed loop path such that only when said film receptacle at said print loading station has a specific negative film loaded thereon is said print receptacle positioned in said print loading station for receiving a cluster of prints made from said specific negative film.

2. An integrated photofinishing apparatus as defined in claim 1, wherein said sorting apparatus comprises film retaining means installed to said film receptacle for retaining the negative film in said film receptacle.

3. An integrated photofinishing apparatus as defined in claim 2, wherein said film loading station is located in the proximity of said exposure apparatus.

4. An integrated photofinishing apparatus as defined in claim 2, wherein said film loading station is located below said print loading station.

5. An integrated photofinishing apparatus as defined in claim 4, wherein said sorting apparatus further comprises a film conveyer extending between said film loading station and said print loading station.

6. An integrated photofinishing apparatus as defined in claim 1, wherein said film loading station is located in the proximity of said exposure apparatus.

7. An integrated photofinishing apparatus as defined in claim 1, wherein said film loading station is located below said print loading station.

8. An integrated photofinishing apparatus as defined in claim 7, wherein said sorting apparatus further comprises a film conveyer extending between said film loading station and said print loading station.

9. An integrated photofinishing apparatus having at least an exposure apparatus for exposing a continuous web of photographic paper to a negative film and delivering the negative film at a film loading station, a photofinishing apparatus for finishing an exposed part of the photographic paper, cutting the photographic paper into individual prints and delivering a cluster of prints made from the negative film at a print loading station, and a sorting apparatus for sorting the prints according to negative films, said sorting apparatus comprising:

- a plurality of receptacles, each of which has a film receptacle section and a print receptacle section for receiving a negative film at said film loading station and a cluster of prints at said print loading station;
- film retaining means attached to each said receptacle for retaining a negative film in said film receptacle section;
- receptacle guide means, forming a closed loop path, for guiding each said receptacle between said film loading station and said print loading station; and
- drive means for driving said receptacles in said closed loop path such that each said print receptacle section adjacent to said film receptacle section with a specific negative film is positioned in said print loading station before a cluster of prints made from said specific negative film are delivered from said photofinishing apparatus.

10. An integrated photofinishing apparatus as defined in claim 9, wherein said film loading station is located in the proximity of said exposure apparatus.

11. An integrated photofinishing apparatus as defined in claim 9, wherein said film loading station is located below said print loading station.

12. An integrated photofinishing apparatus as defined in claim 11, wherein said sorting apparatus further comprises a film conveyer extending between said film loading station and said print loading station.

* * * * *